Nov. 19, 1968   W. O. HALL   3,412,271
BRUSHLESS TYPE ALTERNATING CURRENT MACHINE
Filed Dec. 8, 1965

WITNESSES:
John L. Chopp
Elroy Strickland

INVENTOR
Walter O. Hall
BY F. P. Lyle
ATTORNEY

United States Patent Office 3,412,271
Patented Nov. 19, 1968

3,412,271
BRUSHLESS TYPE ALTERNATING
CURRENT MACHINE
Walter O. Hall, Lima, Ohio, assignor to Westinghouse Electric Corporation, Pittsburgh, Pa., a corporation of Pennsylvania
Filed Dec. 8, 1965, Ser. No. 512,427
5 Claims. (Cl. 310—68)

The present invention relates to dynamoelectric machines and particularly to synchronous alternating current machines of the brushless type wherein a rotating rectifier exciter assembly is mounted in the center of the shaft of an alternating current machine.

One of the primary objects of exciting a synchronous generator with a rotating rectifier is to provide efficiency and reliability for power generating systems through the concept of brushless operation. To this end a rotating armature provides an alternating voltage for application to a rotating rectifier means physically disposed on a common shaft with the rotating armature. The alternating voltage is rectified by the rectifying means and applied to the rotating field of a main generator which is also disposed on the common shaft, and brushless delivery of generator excitation power is thereby achieved. Efficiency and reliability are accomplished through the elimination of maintenance and replacement problems normally associated with brushes, commutators and collector rings.

The rotating rectifier assembly used in machines of the brushless type consists of a suitable number of semi-conducting diodes electrically connected together in a suitable excitation circuit pattern between the exciter armature and the main generator rotating field winding. The rectifiers may be physically mounted inside a hollow, rotating generator shaft such as shown and described in U.S. Patent 2,897,383 which issued July 28, 1959 to R. C. Barrows et al. and is assigned to the present assignee. As shown in the Barrows et al. patent, the rectifiers or diodes are arranged in a row along the center of the shaft with the rotational axis thereof normal to the diode rectifying junctions. This type of arrangement requires specially made rectifiers having short dimensions for the limited longitudinal space available in the shaft. Further, such a mounting structure requires all diodes to be insulated from each other and from the generator shaft. Additionally, the diodes must be cooled by special means such as finned housings or cooling fluids conducted directly over and around the individual diodes.

In view of the above, what is needed in the rotating rectifier art is a structure that will allow mounting of the diodes in a crosswise manner inside a generator-exciter shaft so that the overall length of the structure would be considerably shortened, and standard diode devices could be used. The difficulty here is to obtain a system that is dynamically balanced since the center of gravity and mounting plane for different diodes would not always be the same.

Therefore, the general and paramount purpose of the present invention is to provide a simple and inexpensive mounting means that will permit crosswise mounting of rotating rectifier diodes within a generator-exciter shaft and be dynamically balanced for substantially all suitable standard diodes.

A more specific object of the invention is to provide a rotating rectifier assembly in which the diodes are arranged in three pairs inside a generator-exciter shaft in a manner crosswise thereto with the centers of gravity of all pairs of diodes in the same plane normal to the axis of rotation and the center of gravity of each pair displaced 120 degrees.

Another object of the invention is to provide an efficient diode mounting assembly and connecting means for a rotating rectifier that will insure diode reliability, and simplify repair and maintenance procedures.

Yet another object of the invention is to provide a dynamically balanced rotating rectifier assembly in which the diodes are effectively and efficiently cooled without the use of finned housings and cooling liquids.

Briefly, these and other objects are accomplished by mounting the rectifiers on simple and identically punched and formed metal sheets which can also serve as connectors for the exciter armature phase leads and heat sinks for the diodes. Three such metal sheets are used and the sheets may be made from aluminum or other similar metals. Each sheet supports one pair of rectifiers consisting of one forward polarity diode and one reverse polarity diode. When the three pairs of rectifiers are electrically connected together they form a full wave rectifying bridge for supplying direct current excitation to a main alternating current generator.

The three pairs of diodes and three sheet metal mounting plates, which are identical in weight, form a balanced assembly when placed inside the generator shaft in a crosswise, off shaft center manner with the centers of gravity of each pair and plate being angularly displaced 120 degrees from each other. The off shaft center mounted diodes are cooled as they move through the atmosphere within the shaft when the shaft rotates. The crosswise mounting of the diodes causes the rectifying junctions to be in compression due to the centrifugal force accompanying shaft rotation. The compression is steady and results in a very favorable condition for rectifier reliability.

At the generator end of the shaft is disposed a terminal board preferably in the form of an insulating disc. In the board are disposed connecting means for receiving and securing lead ends from the diodes and from the generator field and exciter armature windings. The lead ends may include terminal clips, and the terminal board may contain threaded terminal clips, and the terminal board may contain threaded terminal studs for securing and connecting the leads together. With such means the field and armature leads may be simply and easily disconnected and when it is desired to remove the diode assembly from the shaft, say for repair purposes.

Other advantages and objects of the invention will be apparent from the following detailed description taken in conjunction with the accompanying drawing in which.

Figure 1:
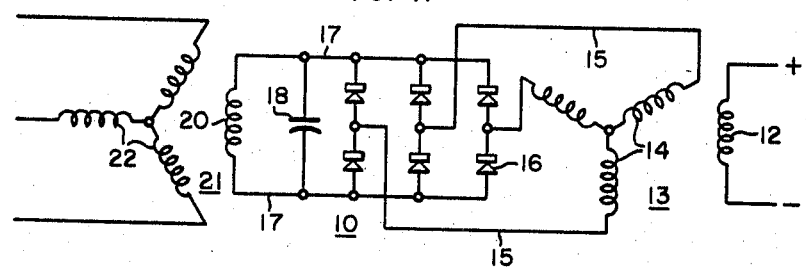
FIGURE 1 shows a circuit diagram of a typical brushless synchronous generating system in which a rotating rectifier assembly is employed.

FIG. 1 shows a typical rotating rectifier system 10 in which diodes 16 are employed to rectify the output of alternating current exciter 13 for application to the field winding 20 of alternating current main generator 21. Stationary field winding 12 is used to excite rotating armature 14 which is shown as a three phase winding. Exciter field 12 may be energized with direct current from any suitable external source, or may be excited from the output of generator 21 through a rectifier and voltage regulator.

The rotating rectifier circuit is shown as a conventional three-phase rectifier bridge in combination with exciter armature 14 and generator field 20, all of which are mounted on the same rotating shaft. Thus, the components can be connected directly together via conductors 15 and 17 providing generator 21 with direct current excitation without requiring any commutator, brushes or slip rings.

The rectifier assembly 10 consists of a suitable number of semiconductor diodes 16 of suitable construction, silicon diodes being preferred because of their high current capacity and their ability to operate at high temperatures.

Figure 2:
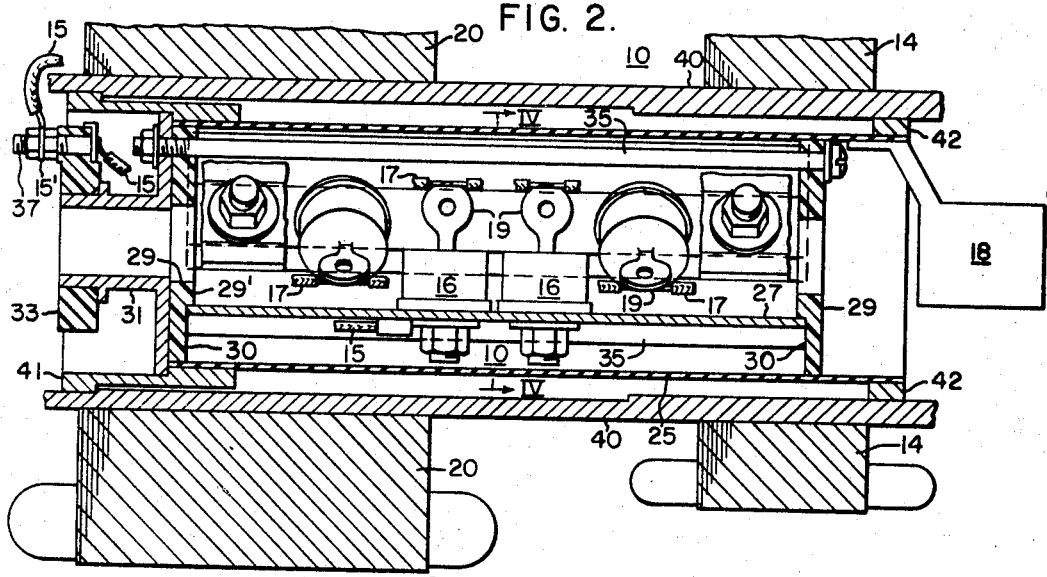
FIG. 2 is a side elevation view of the rotating rectifier assembly constructed in accordance with the principles of the present invention shown partly in section and partly cut away.

Across the diode circuit is connected capacitor 18, the purpose of which is to protect diodes 16 from high current spikes that may occur under transient conditions. In FIG. 2 capacitor 18 is shown disposed in the axial center of rotating shaft 40 at the right end thereof.

In accordance with the present invention, as shown in FIG. 2, rectifier assembly 10 is disposed within an insulating tube 25 which forms a part of the rotating rectifier support structure. Insulating tube 25, in turn, is supported in the center of rotor shaft 40 which supports rotating main field winding 20 and rotating armature 14 in a well known manner best shown and described in the above-mentioned Barrows et al. patent. For the purpose of the present disclosure, stator armature windings 22 and stationary direct current field winding 12 are not shown in FIG. 2. However, these structures would preferably be substantially the same as those shown in FIG. 1 of the Barrows et al. patent.

Figure 5:
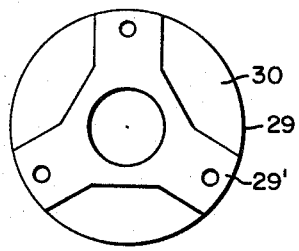
FIG. 5 is an inside elevation view of the end spacers employed in the structure shown in FIG. 2.

Inside tube 25 are disposed three elongated metal plates 27 provided to support rectifying diodes 16 in a manner to be more fully explained hereinafter. Plates 27 extend substantially throughout the length of insulating tube 25, the ends of which are supported by inwardly facing shoulder portions or ledges 29' provided in end insulating spacers 29. Ledges 29' are formed by recessed areas 30 into which the ends of plates 27 extend as best seen in FIG. 2. Each ledge 29' takes essentially a Y-shaped configuration with each leg thereof displaced from each other by an angle of 120 degrees as seen in FIG. 5. End spacers 29 are, in turn, held together within tube 25 by long through bolts 35; the end spacers are held in a longitudinally spaced apart manner by the same rigid but thin metal plates 27.

Figure 4:
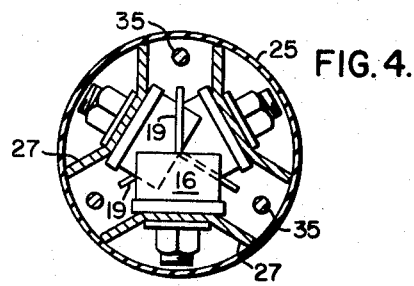
FIG. 4 is a view of the structure shown in FIG. 2 taken along lines IV—IV, shown partly in cross section and partly in elevation.

Ledge or shoulder portions 29' and recessed areas 30 (FIG. 5) are formed to take the configuration of plates 27 as shown in cross-section in FIG. 4, plates 27 being provided with two angular bends that extend the entire length thereof. Such a bent configuration allows the plates to fit neatly within insulating tube 25 to be secured thereby. The bent configuration and Y-shaped ledges 29' further allow plates 27 to be angularly displaced from each other by an angle of 120 degrees. The longitudinal edges of plates 27 rest on the inside surface of tube 25 as best seen in FIG. 4. Tube 25 and end spacers 29 (FIG. 5) secure diode support plates 27 in an insulating manner within the tube which allows the three metal support plates 27 to be insulated from the hollow rotating generator shaft 40 and from each other. Thus each metal plate 27 can further function as a portion of phase lead 15. As shown in FIG. 2, the diode end of one phase lead 15 is secured to the bottom of the left-center diode and plate 27 by the threaded stud and nut means securing the diode to plate 27. Apertured terminal lugs 19 form the other terminal means for diodes 16 as best seen in FIG. 2.

On the left-hand end of the structure as shown in FIG. 2, is disposed a metal tubular stub shaft means 31 suitably supporting a terminal board means 33 in the form of an insulating disc. Stub shaft 31, diode support plates 27 and end spacers 29 are held in place by the three long through bolts 35 with associated washers and nuts as shown.

Diodes 16 are secured to metal plates 27 by nut and threaded stud means provided as part of the rectifier structure. Plates 27 may be made of sheet aluminum or other suitable metals and metal structures. Holes are provided in plates 27 for receiving the diode studs, and each plate can serve as a heat radiating surface to assist in cooling diodes 16. All of the plates 27 are identical in weight so that the three plates angularly displaced about the axial center of assembly 10 by equal angles of 120 degrees will not unbalance the structure. Similarly, each plate 27 carries a pair of diodes identical in weight with each pair having their centers of gravity equally angularly displaced. In the same manner, through bolts 35 are identical in weight and angular displacement. Thus all the components that are supported off the center axis of the assembly are dynamically balanced by equal angular displacement of components having the same weight. Such an off-centered, balanced assembly provides a shorter, more compact structure for brushless type alternating current machines. Further, standard, and therefore less costly, rectifiers can be used instead of the specially made diodes required in the machine disclosed in the above-mentioned patent.

Each pair of diodes shown in assembly 10 consists of a forward polarity diode and a reverse polarity diode electrically connected together by metal plate 27 and leads 15 and 17 to form a full wave rectifier circuit in each leg of the three phase exciter armature 14. Armature phase leads 15 may be connected to diodes 16 through terminal board 33, one lead 15 shown attached to each side thereof as shown in FIG. 2. The portion of lead 15 connected on the outside of terminal board 33 extends along the outside of rotor shaft 40 to armature 14.

Figure 3:
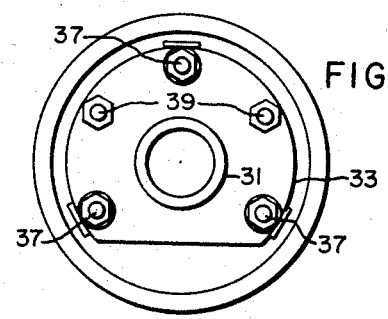
FIG. 3 is an end elevation view of the structure shown in FIG. 2 as seen from the left-hand end.

Terminal board 33 can include threaded stud means 37 and 39 to make the connections between diodes 16 and the exciter and rotating field windings. As shown in FIG. 3, two direct current terminal studs 39 and three alternating current teminal studs 37 are provided in insulating disc 33. Diode leads 15 running between terminal disc 33 and diodes 16 can have one end brazed to studs 37 and the other end secured to the diode supporting studs by threaded nuts as shown in FIG. 2. The terminal board ends of the armature phase leads 15 may have terminal clips 15' so that the lead ends may be simply and easily secured to terminal studs 37 by threaded nuts disposed thereon as shown. In the same manner, the direct current leads 17 extending between field winding 20 and terminal disc 33 can have terminal clips affixed to their terminal disc ends for quick and efficient securing to terminal studs 39. The ends of leads 17 located inside tube 25 and extension 41 can have their ends respectively brazed to diode terminal lugs 19 and studs 39.

Insulated bushings can be provided in the metal structures comprising stub shaft 31 and rotor shaft 40 for supporting leads 15 and 17 which may extend therethrough.

With the use of terminal clips on the outside of terminal disc 33, rectifier assembly 10 can be easily and quickly disconnected for removal of the assembly for test, repair and maintenance purposes. No soldering or brazing is required; only simple hand tools are needed to connect or disconnect and secure or remove the rectifier assembly 10.

FIGS. 2 and 4 show clearly the crosswise mounting configuration of diodes 16 proposed by the present invention. The PN junction of diodes 16 are thus disposed in a plane parallel to the plane of the mounting surface formed by support plates 27. The junctions are therefore compressed by the centrifugal force accompanying the rotation of shaft 40 and assembly 10. The centrifugal force is steady and at 6000 r.p.m. amounts to about 1000 g's per inch distance from the center of mass rotation. This steady force is sufficient to make all other dynamic forces acting upon the diodes insignificant, resulting in a very favorable environment for diode reliability.

Insulating tube 25, with rectifier assembly 10 supported therein, is disposed in the center of rotor shaft 40, and can be suitably secured and centered therein by annular sleeve 41 and ring spacer 42 as shown in FIG. 2.

The left-hand end of the rotor shaft 40 may have an extension or other suitable means for mechanical engagement with a driving means (not shown). In use, the machine is intended to be mounted on its prime mover by a frame flange or other suitable means (not shown) with the end of shaft 40 coupled to the driving member of the prime mover.

It should now be apparent that a generator of the brushless type has been disclosed which has many advantages heretofore unavailable. The crosswise mounting configuration of rectifier assembly 10 substantially reduces the length of the rotor shaft and the assembly which is particularly important in aircraft generators which are mounted at one end on a prime mover; the length of the generator must be kept as short as possible. The crosswise mounting of diodes 16 in the present invention further dynamically balances the assembly so that the PN junctions are in a constant, steady state of compression during rotation of the assembly thereby enhancing rectifier service and reliability. Further, diodes 16 are cooled by their support structure 27 and by virtue of their rotation; no additional cooling liquids and pump means or heat sinks are therefore necessary. Yet the rectifier assembly 10 is readily accessible for replacement when necessary with terminal board means 33 further enhancing the simplicity and efficiency of repair accompanying applicant's unique combination of standard, inexpensive components.

Though the invention has been described with a certain degree of particularity, it should be understood that the present disclosure has been made by way of example only and that changes in details, combination and arrangement of parts may be accomplished without departing from the spirit and scope of the invention.

I claim as my invention:

1. A dynamoelectric machine having an alternating current winding and a direct current field winding, said field winding disposed on a hollow rotatable shaft, exciting means for said field winding including a stationary field member, a rotating armature mounted on the hollow shaft, a semiconductor junction rectifier assembly disposed within the hollow shaft and electrically connected between the direct current field winding and the rotating armature, and means for supporting and energizing the rectifiers of said assembly in a crosswise manner with the axis of rotation parallel to the recitfying junctions, said means further supporting the rectifiers in an angularly spaced manner about the axial center of the hollow shaft so that the assembly is dynamically balanced.

2. The dynamoelectric machine of claim 1 in which the rectifiers are arranged in three pairs with the center of gravity of each pair displaced 120 degrees around the axial center of the shaft.

3. The dynamoelectric machine of claim 2 in which each pair of rectifiers is mounted on a thin metal plate.

4. The dynamoelectric machine of claim 2 wherein each pair of rectifiers is mounted on a thin metal plate, and each metal plate functions as an excited armature phase lead to electrically connect the rectifiers to the the armature.

5. The dynamoelectric machine of claim 2 in which the rotating shaft supports a terminal means adjacent at least one end thereof for connecting together lead ends from the field and armature windings and rectifiers.

References Cited
UNITED STATES PATENTS

| | | | |
|---|---|---|---|
| 2,832,907 | 4/1958 | McConnell | 310—68 |
| 2,897,383 | 7/1959 | Barrows | 310—68 |
| 3,145,314 | 8/1964 | Becker | 310—68 |
| 3,283,219 | 11/1966 | Keady | 310—68 |
| 3,348,127 | 10/1967 | Petersen | 317—234 |
| 3,354,330 | 11/1967 | Storsand | 310—68 |

J. D. MILLER, *Primary Examiner.*